United States Patent [19]

Dobinson et al.

[11] 3,865,621

[45] Feb. 11, 1975

[54] TREATMENT OF FIBROUS MATERIALS

[75] Inventors: Bryan Dobinson; Kenneth Winterbottom, both of Cambridge, England

[73] Assignee: Ciba-Geigy AG, Basle, Switzerland

[22] Filed: Sept. 20, 1973

[21] Appl. No.: 399,205

[30] Foreign Application Priority Data

Aug. 15, 1969 Great Britain.................... 40866/69
July 3, 1970 Great Britain.................... 32460/70

[52] U.S. Cl......................... 117/141, 8/115.6, 8/116
[51] Int. Cl......................... C08h 19/02, D06m 3/02
[58] Field of Search................. 8/115.6, 128 A, 116; 117/141, 161 UD

[56] References Cited
UNITED STATES PATENTS

| | | | |
|---|---|---|---|
| 2,447,877 | 8/1948 | Rust............................ | 117/141 X |
| 2,467,233 | 4/1949 | Rust............................ | 117/141 X |
| 2,704,729 | 3/1955 | Fetscher...................... | 117/161 |
| 2,737,434 | 3/1956 | Pierce.......................... | 8/115.6 |
| 3,096,524 | 7/1963 | Mizell.......................... | 8/115.6 X |
| 3,268,915 | 8/1966 | Warnock et al................ | 8/115.6 X |
| 3,477,804 | 11/1969 | Friedl........................... | 8/128 |
| 3,531,429 | 9/1970 | Schmidt et al................. | 8/115.6 X |
| 3,551,193 | 12/1970 | Suzuki.......................... | 117/161 |
| 3,624,046 | 11/1971 | Charle......................... | 117/141 X |

FOREIGN PATENTS OR APPLICATIONS 741,818  8/1966  Canada

*Primary Examiner*—William E. Schulz
*Attorney, Agent, or Firm*—Joseph G. Kolodny; Edward McC. Roberts; Prabodh I. Almaula

[57] ABSTRACT

A process for modifying fibrous materials, especially keratinous and cellulosic materials is provided. Polythiols which are polymers based on polybutadiene or poly(methylbutadiene), containing, on average, more than one thiol group per molecule, directly attached to carbon atoms of the polymer are used optionally in combination with an aminoplast. The polymers cure on the fiber. Keratinous materials are rendered resistant to shrinkage and durable press characteristics are imparted. Cellulosic fibers are rendered crease-resistant and durable press characteristic may be imparted too.

8 Claims, No Drawings

TREATMENT OF FIBROUS MATERIALS

The present invention relates to a process for modifying fibrous materials, particularly keratinous and cellulosic materials.

We have found that certain polymers based on polybutadiene or poly(methylbutadiene) and containing, on average, more than one thiol (—SH) group per molecule, can be used to modify the properties of keratinous and cellulosic fibrous materials. These polymers cure, i.e., undergo reaction, on the fibre, the rate of curing being largely controlled by the selection of an appropriate catalyst.

Application of these polymers to keratinous materials renders the materials resistant to shrinkage and enables durable press characteristics to be imparted to the material.

A number of shrink-resist processes for keratinous material are known, some of which comprise the application of a resin to the material which may be fabric or fibre form. Shring-resist processes stabilize the dimensions of keratinous materials against shrinkage due to felting.

Durable press processes for keratinous material are also known and many of them employ resins the same or similar to those used in shrink-resist proceses. In some durable press processes the desired shape is imparted to the keratinous material before the resin is cured and then curing is allowed to take place whilst the material is maintained in the desired shape, e.g., in form of creases or pleats. In others the resin is applied after the desired shape is imparted to the material. Durable press processes stabilize the shape and surface smoothness of the material against deformation in the presence of aqueous solutions. The desired shape may be imparted to the material before or after resin treatment by well known methods involving the use of setting agents such as water, reducing agents, and bases.

A desirable, though not essential, feature of shrink-resist and durable press processes is that the keratinous material so treated should be washable in domestic washing machines. To be machine-wasable the finish on the treated material should withstand vigorous agitation in warm or hot water containing detergents, and this requirement sets a severe test for the durable press and shrink-resist treatments.

One of the attractions of keratinous fibres and particularly wool is their excellent handle, and an important disadvantage associated with many of the resins used in shrink-resist and durable press processes is the harsh handle imparted to the fibre and fabric containing the fibres. Attempts to overcome this harsh handle have been made by the use of softeners, but these have often been unsuccessful in that they reduce the effectiveness of the resin.

We have now found that the aforesaid thiol-containing polymers can be used successfully in durable press and shrink-resist processes on keratinous materials and, unless used in excessive quantities, do not impart an unattractive handle to the treated material.

Cellulosic fibres, usually in the form of textiles, are often treated with aminoplasts, and the aminoplast is cured in situ, to impart such effects as enhanced dimensional stability or resistance to creasing, and mechanical effects such as pleating. However, textiles so treated frequently have lower tear-strength than has the untreated material, and the handle is often harsher. These drawbacks have been overcome to a certain extent by using with the aminoplast softening agents containing long-chain molecules, such as a polyethylene emulsion or an adduct of ethylene oxide with an amine or a phenol. For many purposes, however, the agents employed are insufficiently effective. We have further found that the aforesaid thiol-containing polymers can be used in conjunction with certain aminoplasts and the disadvantages associated with the use according to known procedures of aminoplasts can thereby at least substantially be overcome.

The present invention accordingly provides a process for modifying fibrous material, particularly keratinous or cellulosic material, which comprises 1. treating the material with a polythiol which is a hompolymer or copolymer of butadiene or methylbutadiene having, per average molecule, more than one —SH group directly attached to carbon atoms of the polymer and, optionally, with an aminoplast which is free from ethylenic unsaturation, and
2. curing the polythiol, and the aminoplast if used, on the material.

This invention also provides cellulosic or keratinous fibrous materials, in the form of fabrics if desired, bearing thereon a polythiol as aforesaid in the cured or still curable state.

The treatment of keratinous material according to the invention, whether to achieve shrink-resist or durable press effects, provides fibres or garments which will withstand washing in machines and still retain their original dimensions and shape. In addition to the good handle obtainable with material treated in accordance with the invention, the treated material also has good recovery from wrinkling, which is an important attribute in fabrics employed in trousers where there is a strong tendency to wrinkles in the areas of the knee and back of the knee. Of course, wrinkle-resistance is an important advantage in many garments.

The polythiols used in the process according to the invention, as well as inhibiting or preventing felting shrinkage, also inhibit or prevent relaxation shrinkage, which is an important problem associated with knitted goods.

The term 'keratinous material' as used throughout this specification includes all forms of keratinous fibres or fabrics and garments made therefrom, e.g., fleeces, tops, card sliver, noils, yarns, threads, pile fabrics, non-woven fabrics, woven fabrics and knitted goods. In most cases the treatment will be applied to fabrics or made-up garment though it is quite feasible, and may be desirable in some circumstances, to render shrink-resistant fibres, e.g., in the form of tops. The material to be treated can consist either wholly of keratinous fibres or of blends of these fibres with synthetic fibrous and filamentary material such as polyamides, polyesters, and poly(acrylonitrile), and with cellulosic and re-generated cellulosic material.

The keratinous material may be virgin or reclaimed: preferably, though not necessarily, it is sheep's wool. It may also be derived frm alpaca, cashmere, mohair, vicuna, guanaco, camel hair, and llama, or blends of these materials with sheep's wool.

Where cellulosice material is to be treated, an aminoplast is generally used, and treatment of the cellulosic material with the aminoplast and the polythiol, and curing the aminoplast on the material, can take place in any desired sequence. For example, the fibres may be impregnated with a mixture of the aminoplast and the polythiol, and then the aminoplast is cured. Or the material may be impregnated first with the polythiol and then with the aminoplast, or vice versa, and then the aminoplast is cured. Or the aminoplast can be cured on the material, which is then treated with the polythiol.

The term "cellulosic" includes materials derived from cellulose in which less than three of the available hydroxyl groups per anhydrogluco unit have been modified, e.g., by acylation, cyanoethylation, or etherification, such as cellulose monoacetate and cellulose 2½-acetate (but not, for example, cellulose triacetate).

Cellulosic fibres which may be subjected to the process of this invention include cotton, regenerated cellulose (including viscose rayon and cuprammonium rayon), jute, linen, hamp, ramie, sisal, paper, and blends of these with synthetic fibres or filaments. The cellulosic fibres are preferably textiles, including yarns, threads, fabrics in woven and non-woven form (including knitted goods), and garments.

The thiol-containing polymers used in the process of this invention preferably contain carbon — carbon ethylenic double bonds.

One class of such polymers comprises those having the —SH groups distributed along the backbone of the polymer. As is well known, in the polymerisation of butadiene and methylbutadiene 1,2- and/or 1,4-addition occurs, depending on the conditions employed. The poly(butadiene) or poly(methylbutadiene) may be a copolymer; thus, it may, for example, also contain units of one or more of acrylonitrile, acrylic acid, alkyl acrylates, acrylamide, styrene, or vinyl esters of alkanoic acids, also their homologues, such as methacrylamide.

These polymers thus comprise units of the formulae

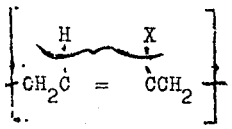

and/or

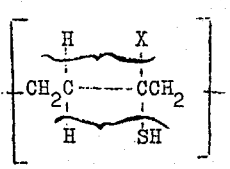

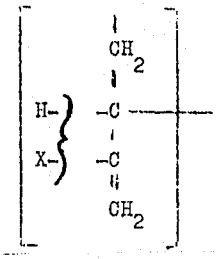

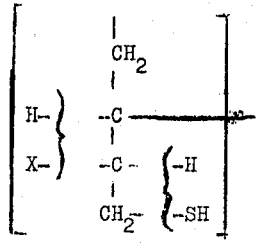

and, optionally, units of formula

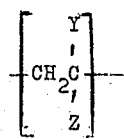

wherein X and Y each independently represent hydrogen or methyl,

Z represents —CN, —COOH, —CONH$_2$, —COOR, —C$_6$H$_5$, or —OCOR, where R is an alkyl group of one to eight carbon atoms.

The average number molecular weight of the polythiol is usually at least 500 but at most 50,000, preferably between 1,000 and 10,000, and especially from 1,250 to 5,000.

Such polymers may be obtained by reaction of a poly(butadiene) with a carbothiolic acid of formula R$^1$COSH, where R$^1$ denotes an organic residue directly linked through a carbon atom thereof to the indicated —COSH moiety such that addition of the —SH group to ethylenic double bonds of the poly(butadiene) occurs, the quantity of the carbothiolic acid being chosen such that addition takes place at some, but not all, of the ethylenic double bonds, followed by saponification to replace the R$^1$COS— substituent by HS—.

Such polymers may also be obtained by direct addition of hydrogen sulphide to polybutadiene. (See, e.g., U.S. Pat. No. 3282901 and Oswald, Reports of 151st American Chemical Society Meeting, 1966, Division of Petroleum Chemistry.)

Particularly preferred for use in the process of this invention are such polymeric polythiols which are substantially comprised of units, in any desired sequence, of the formulae

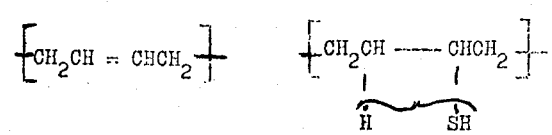

and/or

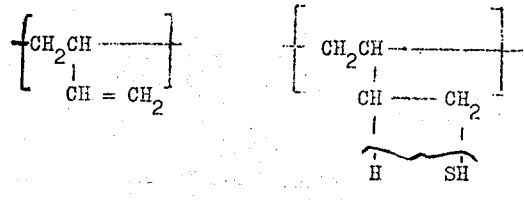

The polymers may also, if desired, contain units of formula

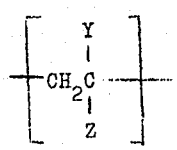

where Y and Z have the meanings previously assigned.

A second class of polythiols suitable for use in the process of this invention comprises those having terminal —SH groups, i.e., at the ends of the polybutadiene chains.

Such polythiols are described by Drake and McCarthy in *Rubber World*, October 1968, pp. 51–56; by Uraneck, Hsieh, and Sonnenfeld, in *J. Appl. Polymer Sci.*, 1969, 13, 149–168; in Canadian Pat. No. 741818; and in United Kingdom Specification No. 1139655. These polymers are usually obtained by free radical-catalysed emulsion polymerisation of buta-1,3-diene or isoprene in the presence of a xanthogen disulphide, such as di-isopropylxanthogen disulphide, followed by hydrolysis or pyrolysis of the resultant polymeric bisxanthate. If desired, one or more mono-olefines such as acrylonitrile, acrylic acid, acrylamide, or esters of acrylic acid with an alkanol containing from one to eight carbon atoms, may be copolymerised with the butadiene or isoprene.

It is likewise considered that, in the polymerisation of the butadiene, 1,2- and/or 1,4-additions occur. Hence the polythiols contain terminal units of formula

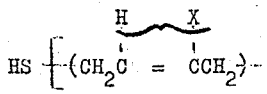

and/or

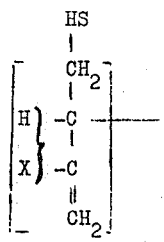

and, optionally, units of formula

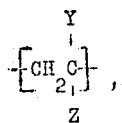

where X, Y, and Z have the meanings previously assigned.

The preferred polythiols thus contain structures which may be represented by the formula

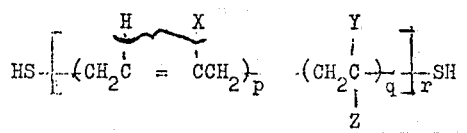            I wherein

X, Y. and Z have the meanings previously assigned, $p$ is a positive integer and $q$ is zero or a positive integer, and $r$ is an integer such that the average number molecular weight of the polythiol is at least 500.

It will be understood that, in formulae I – VI, where units of a copolymerisable acrylic or vinylic compound are present, these may occur in any order along the chain. Further preferred among such polythiols for use in the process of this invention are those which contain structures of the formula

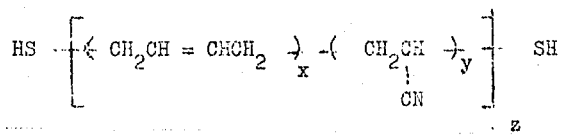    II wherein $y$ is either zero, in which case $z$ is one, or $y$ is one, in which case $x$ is an integer of at least two and at most five, and is preferably three;

and $z$ is an integer such that the polymer has a number average molecular weight of at least 1,000 and at most 10,000, preferably between 1,250 and 5,000. It is considered most probable that polymers of formula III are present.

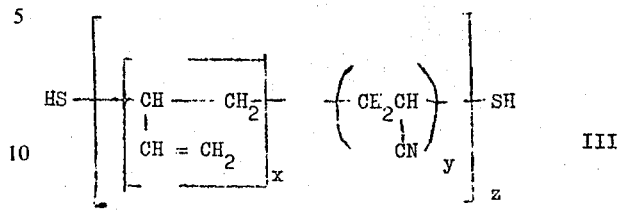    III

The aminoplasts which may be employed in conjunction with the polythiols according to the present invention are usually those which contain per molecule, at least two groups of formula —$Ch_2OR^2$ directly attached to a nitrogen atom or atoms of an amidic nature such as those present in urea and melamine, where $R^2$ denotes a hydrogen atom, an alkyl group of from one to four carbon atoms, or an acetyl group. Examples of such aminoplasts are the N-hydroxymethyl, N-alkoxymethyl, and N-acetoxymethyl derivatives of following amides and amide-like substances.

I. Urea, thiourea, and the cyclic ureas having the formula

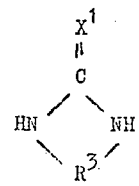

in which $X^1$ denotes oxygen or sulphur, and $R^3$ denotes either a group of formula

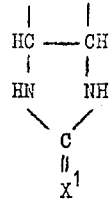

(where $X^1$ has the meaning previously assigned) or a divalent group containing from 2 to 4 carbon atoms in the chain, which may be substituted by methyl, methoxy, and hydroxy groups, and which may be interrupted by

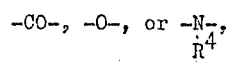

where $R^4$ denotes an alkyl or hydroxyalkyl group containing up to 4 carbon atoms. Examples of such cyclic ureas are ethyleneurea (imidazolidin-2-one), dihydroxyethyleneurea (4,5-dihydroxyimidazolidin-2-one), hydantoin, uron (tetrahydro-oxadiazin-4-one) 1,2-propyleneurea (4-methylimidazolidin-2-one), 1,3- propyleneurea (hexahydro-2H-pyrimid-2-one), hydroxypropyleneurea (5-hydroxyhexahydro-2H-pyrimid-2-one), dimethylpropyleneurea (5,5-dimethylhexahydro-2H-pyrimid-2-one). dimethylhydroxypropyleneurea and dimethylmethoxypropyleneurea (4-hydroxy- and 4-methoxy-5,5-dimethylhexahydro-2H-pyrimid-2-one), and 5-ethyl- and 5-(2-hydroxyethyl)-triazin-2-one.

II. Carbamates and dicarbamates of aliphatic monohydric and dihydric alcohols containing up to four carbon atoms and optionally substituted by a hydroxy or methoxy group, e.g., methyl, ethyl, isopropyl, 2-hydroxyethyl, 2-methoxyethyl, 2-hydroxy-n-propyl, and 3-hydroxy-n-propyl carbamates, and ethylene and 1,4-butylene dicarbamates.

III. Melamine, and other polyamino-1,3,5-triazines.

If desired, aminoplasts containing both N-hydroxymethyl and N-alkoxymethyl, or N-hydroxymethyl and N-acetoxymethyl groups, may be used, for example a hexamethylol melamine in which from 1 to 5 of the methylol groups have been etherified or esterified.

The aminoplast is usually applied as such, but if desired, when a urea-formaldehyde or melamine-formaldehyde product is to be used, it may be formed in situ in a conventional manner from a urea-formaldehyde or melamine-formaldehyde concentrate and the requisite additional urea or melamine.

The polythiols may be used alone or in association with other resins or resin-forming substances, such as: other polymercaptans (which may be monomeric or polymeric); epoxy resins (i.e., substances containing on average more than one 1,2-epoxide group per molecule); acrylic resins, including polymers and copolymers of acrylate esters, e.g., ethyl, n-butyl and 2-hydroxyethyl acrylates, and acrylamide; or polyisocyanates, including prepolymers of a poly(oxyalkylene) glycol and an aromatic diisocyanate or of a poly(oxyalkylene) triol and an aliphatic diisocyanate.

Of the various classes of polymercaptans that may be used in conjunction with the polythiols of this invention, two particularly useful groups can be distinguished.

A. Those esters which are of the formula

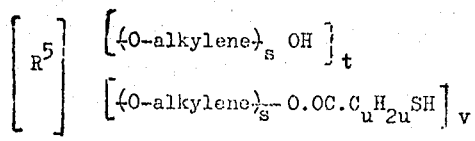

wherein
R$^5$ represents an aliphatic radical containing at least 2, preferably from 3 to 6, carbon atoms, and is especially an aliphatic hydrocarbon radical,
each "alkylene" group contains a chain of at least 2 and at most 6 carbon atoms between the indicated consecutive oxygen atoms,
$s$ denotes an integer, which may have different values in each of the $t$ and $v$ chains, such that the molecular weight of the ester is 400 to 10,000, especially from 1,000 to 5,000,
$v$ denotes an integer of at least 2 and at most 6,
$t$ denotes zero or a positive integer such that $(t + v)$ is at most 6, and
$u$ denotes a positive integer of at most 2.
Such esters, especially those of the above formula in which $v$ is at least 3, while also imparting excellent shrink-resist and permanent-set effects to keratinous materials, further impart to the treated material a softer handle.

B. Those esters which conform to the formula

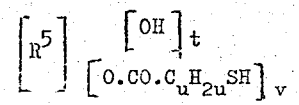

wherein R$^5$ and $t$, $u$, and $v$ have the meanings previously assigned, the molecular weight of the ester being at most 375.

Such esters are useful in that their thiol-group content per unit weight is high, thereby augmenting the relatively low thiol group-content per unit weight of many of the thiol-terminated polybutadienes. Esters containing 3 or more —SH groups per molecule also impart useful effects.

Esters of classes A and B are readily obtainable in a routine manner, e.g. by partial or complete esterification of a polyhydric alcohol [R$^5$] [OH]$_{(t + v)}$ with a mercaptocarboxylic acid HOOC.C$_u$H$_{2u}$SH.

Many of the polythiols are insoluble in water but can be applied as aqueous dispersions or emulsions. Preferably the polythiols are applied to fabrics and garments from organic solvents, for example lower ketones such as ethyl methyl ketone, benzene, and halogenated hydrocarbon solvents, especially chlorinated and/or fluorinated hydrocarbons containing not more than three carbon atoms such as the dry cleaning solvents, carbon tetrachloride, trichloroethylene, and perchloroethylene.

The aminoplasts which may be employed are, in general, soluble in water. Cellulosic material may be treated with the reactants from aqueous solution where possible, or from aqueous emulsion, from solutions in dry-cleaning solvents such as trichloroethylene and perchloroethylene, or from solutions in mixtures of water and a suitable co-solvent, such as methanol.

The amount of polythiol used depends on the effect desired. For most purposes, when not used in conjunction with an aminoplast, from 0.5 to 15% by weight based on the material treated is preferred. Knitted fabrics usually require from 1 to 10% by weight of the resin. A high level of shrink-resistance, crease-setting and substantial resistance to wrinkling can be achieved on woven fabrics with rather smaller quantities. especially from 1 to 5% by weight. The hand or handle of the treated material will, of course, depend on the amount of polythiol employed and by simple experiment the least amount of polythiol required to give the desired effect may readily be determined. Further, the composition and the construction of the fabric also influence the amount of polythiol required.

When an aminoplast is used, the proportions of the polythiol and the aminoplast can vary widely; usually there will be employed, per thiol group equivalent of the polythiol, from 2 to 50 or even 75, but usually from 5 to 40, N-methylol, N-alkoxymethyl, and/or N-acetoxymethyl group equivalents of the aminoplast. The aminoplasts are used in conventional amounts, say from 1 to 10% by weight of resin-forming substance in the aminoplast based on the material treated.

The desired effects are not always fully obtainable until the polythiol on the material has substantially cured. At ordinary temperatures this may take from five to ten days or even longer. The curing reaction can, however, be accelerated greatly by the use of a catalyst, and generally it is preferred to add the catalyst to the material to be treated at the same time as the polythiol is applied although it may be added before or afterwards if desired. The curing time can be controlled by selecting an appropriate catalyst and the choice of curing time will depend on the particular application of the process according to the invention.

The catalysts may be organic or inorganic bases, siccatives, oxidative curing agents, and free-radical catalysts such as azodiisobutyronitrile, peroxides and hydroperoxides, or combinations of these. As organic bases there may be used primary or secondary amines, especially the lower alkanolamines, e.g., mono- and di-ethanolamine, and lower polyamines, e.g., ethylenediamine, diethylenetriamine, triethylenetetramine, tetraethylenepentamine, propane-1,2-diamine, propane-1,3-diamine, and hexamethylenediamine. As inorganic bases there may be used the water-soluble oxides and hydroxides, e.g., sodium hydroxide, and also ammonia. Examples of suitable siccatives are calcium, copper, iron, lead, cerium, and cobalt naphthenates. Examples of peroxides and hydroperoxides which may be used are cumene hydroperoxide, tert.-butyl hydroperoxide, dicumyl peroxide, dioctanoyl peroxide, dilauryl peroxide, methyl ethyl ketone peroxide, di-isopropyl peroxydicarbonate, and chlorobenzoyl peroxide. Other types of catalysts include sulphur, and a sulphur-containing organic compound in which the sulphur is not exclusively present in mercaptan groups, namely a mercaptobenzothiazole or a derivative thereof, dithiocarbamate, a thiuram sulphide, a thiourea, a disulphide, an alkyl xanthogen disulphide, or an alkyl xanthate.

The fibres and fabrics are preferably treated at a pH greater than 7, typically 7.5 to 12: under acid conditions the polythiols tend to cure more slowly.

The amount of catalyst used can vary widely. However, in general from 0.1 to 20%, preferably 1 to 10%, by weight based on the weight of polythiol used is required, although much larger quantities can be used.

Curing of the polythiol is also assisted by using elevated temperatures and if especially rapid results are required then temperatures in the range 30° to 180°C may be used. High humidities also tend to accelerate curing in the presence of catalysts.

The aminoplast, where one is added, may be cured under usual conditions for curing such a substance, i.e. at room temperature or at elevated temperatures. The mechanism by which the polythiol exerts its effect in conjunction with the aminoplast is not known. It is believed that either the —SH group of the polythiol reacts with the N-methylol groups (present as such or formed in situ from esterified or etherified N-methylol groups), and/or oxidation of the —SH groups occurs, molecules of the polythiol being coupled by means of disulphide bridges, the polythiols and the aminoplast exerting their effects independently. The utility of this invention, however, does not depend on the truth of this belief.

In many cases it is desirable to apply a catalyst for curing the aminoplast. Catalysts which may be used are those conventionally employed with aminoplasts and include latent acid compounds and also certain basic substances. Ammonium salts which are latent acids, developing acidity in the mixture on heating, include ammonium chloride, ammonium dihydrogen phosphate, ammonium sulphate, and ammonium thiocyanate. Amine salts may also be used, e.g., 2-amino-2-methylpropanol hydrochloride. There may also be used strong, inorganic acids such as hydrochloric or sulphuric acids which may be used as an aqueous solution (say, as 4- to 8- normal solutions) or which may be dissolved in a mixture of water and a solvent which is immiscible or partly miscible with water, and also acidic gases.

The basic substances $NaHCO_3$ and $Na_2CO_3$ may be employed as catalysts with urea-formaldehyde resins, when it is the usual practice to cure by heating.

If strong acid catalysts are used, heating is not usually required. In other cases it may be necessary to heat, e.g., at a temperature of from 80° to 200°C for from 30 seconds to 10 minutes, and preferably at from 120° to 180°C for from 2 to 7 minutes.

If the polythiol is used in the absence of an aminoplast, curing may still be assisted by using elevated temperatures, and if especially rapid results are required then temperatures in the range 30° to 180°C may be used. High humidities also tend to accelerate curing in the presence of catalysts.

The polythiol, and the catalyst if desired, can be applied to the keratinous material in conventional ways. For example, where wool tops or where fabric is to be treated, impregnation by padding or by immersing the material in a bath may be used. If garments or garment pieces are to be treated then it is convenient to spray them with the polythiol, and more convenient still to tumble the garments in a solution of the polythiol. For the latter method a dry-cleaning machine is a particularly useful apparatus for carrying out the process.

If a shrink-resist treatment is required, then it is usually more convenient to apply the polythiol to the keratinous fabric although, as previously stated, it may be applied to the fibres in the form of tops or card sliver. The fabric may be 'flat-set' before or after treatment with the polythiol and by this means the fabric will, in addition to retaining substantially its original dimensions, also retain its flat smooth appearance during wear and after washing. It should be stated, however, that flat-setting may not be necessary or even desirable with certain types of cloth. Flat-setting is normally carried out either by treating the cloth with steam at superatmospheric pressure, or by treating the cloth with steam at atmospheric pressure in the presence of a setting agent and moisture and maintaining the cloth in a flat state. Flat-setting may also be achieved by applying high concentrations of a reducing agent and a swelling agent, and maintaining the cloth in a flat state during washing off the excess reagents. In another method flat-setting may be achieved by impregnating the keratinous material with a swelling agent and an alkanolamine carbonate, e.g., urea and diethanolamine carbonate, drying the material and then semi-decatising it. Of course, if desired, the fabric may be set with the polythiol, thus effecting setting and shrinkproofing treatments simultaneously.

If a durable press treatment of keratinous material is required, there are a number of ways this may be achieved. One method is to treat the keratinous material with the polythiol, make the material up into garments or garment pieces and insert therein pleats or creases, using reducing agents, bases, or superheated steam as setting agents. Again, the polythiol may be applied to the fibres at any stage during the manufacture of the fabric, e.g., in top form, in yarn, or in fabric form. If desired, agents which block the thiol groups of the wool, e.g. formaldehyde or higher aldehydes, may be applied to the crease or pleated garments after curing the polythiol.

A preferred method of applying the polythiol to obtain a durable press effect comprises treating a made-up keratinous garment or garment piece, which already has the desired creases or pleats imparted thereto, with the polythiol dissolved in an organic solvent. In this method it is essential that the polythiol is applied in an organic solvent because treatment with aqueous systems would only serve to remove the creases or pleats already set in the fabric.

An alternative method, which is primarily concerned with the production of durable press pleats or creases only, comprises impregnating the keratinous fabric in the area where a crease or pleat is to be inserted with the polythiol, imparting the crease or pleat, and maintaining it in this position whilst heat and pressure are applied.

The setting of the keratinous fabric, whether carried out before or after treatment with the polythiol, may be effected using any of the known methods, for example by means of setting agents e.g., reducing agents, bases, water, and superheated steam. Monoethanolamine sesquisulphite is the most frequently used setting agent and may be used in association with a swelling agent, e.g., urea.

A further method, for flat-setting and shrinkproofing keratinous fabrics, comprises treating the fabric with a setting agent and setting it in a flat configuration by heating the fabric while wet, impregnating it with an aqueous emulsion or dispersion of the polythiol and catalyst, drying and heating the fabric, and curing the polythiol. Finally the fabric is made into garments, and creases or pleats set therein if desired by steaming in the presence of a setting agent such as monoethanolamine sesquisulphite.

A crease-resistant finish may be applied to cellulosic fabrics by impregnating the fabric with the polythiol, an aminoplast, and a curing catalyst for the aminoplast, and curing the aminoplast while the fabric is held in a flat state. Compared to fabric treated with aminoplast only, the fabric is considerably softer and has either substantially improved dry crease-resistance with no further loss in tear strength, or substantially improved tear strength with no loss in dry crease-recovery.

A cellulosic fabric having good wet crease-recovery and little dry crease-recovery may be obtained by impregnating the material with the aminoplast, such as a solution of N-methylolated dihydroxyethylene urea, with a strong acid catalyst, e.g., hydrochloric acid, and keeping the wet fabric in a flat state while the aminoplast cures, e.g., for 16 to 24 hours: rinsing the fabric, neutralising and drying it if required, then treating with the polythiol and, if needed, a catalyst for curing the polythiol, and then curing the polythiol. Material after treatment with the polythiol has much better wet crease-recovery than, and equal tear strength to, fabric treated with aminoplast alone.

A durable press cellulosic garment may be made by treating fabric in piece form with the polythiol, the aminoplast and a catalyst for the aminoplast, and drying the impregnated fabric without substantially curing the aminoplast. The fabric is then fashioned into garments, the necessary creases or pleats inserted and the aminoplast is then cured at elevated temperature. Compared to garments treated with aminoplast only, the garment is much softer to the touch and has a much better balance of crease-recovery and strength.

The compositions used in the process of this invention may contain antisoiling, antistatic, bacteriostatic, rotproofing, flameproofing, and wetting agents. They may also contain water-repellents, such as paraffin wax or polyethylene emulsions, and optical brighteners.

The invention will now be illustrated by reference to the following Examples. Unless otherwise specified, parts and percentages are by weight.

The treated samples of cloth were washed at 40°C for one hour in an English Electric Reversomatic washing machine in an aqueous solution containing, per litre, 2 g of soap flakes and 0.8 g of anhydrous sodium carbonate, using a liquor/sample ratio of about 30:1. The samples were rinsed in cold water, spun in the machine and then dried for 30 minutes in a Parnall Tumble Drier on full heat. Shrinkage was measured as the difference in dimensions of the fabric before and after washing. Area shrinkage was calculated from the linear shrinkage measurements.

The polythiols used were as follows. "Polythiol A" denotes "Hycar MTBN" of B. F. Goodrich Chemical Co. According to the manufacturers, it has a number average molecular weight of about 1,700, and contains about 21 butadiene units and 7 acrylonitrile units per average molecule. It may therefore be represented by the formulae

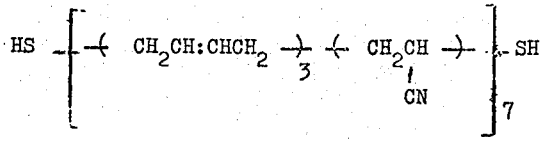

IV and/or

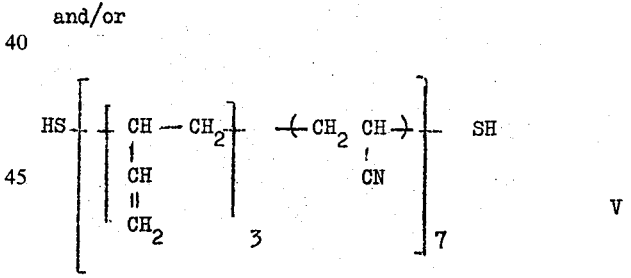

V

Because of side-reactions during its formation, the average number of —SH groups per molecule is about 1.6.

"Polythiol B" denotes a poly(butadiene) having, on average, approximately one —SH group per 1.8 – 3.6 residual ethylenic double bonds, distributed along the backbone of the molecule, and prepared as follows.

A butadiene homopolymer of number average molecular weight 1,500 – 2,500 and containing about 70% of its unsaturation in the form of pendent vinyl groups (obtained from The Richardson Company, Melrose Park, Ill., U.S.A. under the designation "Ricon 150") (100 g) and thiolacetic acid ($CH_3COSH$) (100 g) were stirred together at room temperature (about 22°C) under nitrogen. Heat was evolved, and the temperature of the mixture rose over 1 hour to 36°C. After the mixture had been stirred for 4 days at room temperature, unchanged thiolacetic acid was removed by warming the mixture under reduced pressure. There remained 138 g of a viscous orange liquid. This mass yield corresponds to an addition of 10 molecules of thiolacetic acid per polybutadiene chain, each chain comprising, on average, 28 – 46 butadiene residues.

A portion (27.6) of this S-acetyl polymer was saponified to contain free —SH groups by mixing it with 150 g of ethanol in which 2.3 g of sodium had been dissolved, heating the mixture to refluxing for 15 minutes, then stirring for 16 hours at room temperature. The resultant orange solution was further diluted with methanol to a total weight of 234 g, thus giving a 10% solution of "Polythiol B" in ethanol.

"Polythiol C" denotes a thiol-terminated butadiene-acrylic acid - butyl acrylate - acrylonitrile copolymer which may be represented by the average formula shrunk in area by 12.3 and 17.7%, whereas untreated flannel shrunk by 21.7%.

EXAMPLE 2

In this, and following Examples, the wool flannel was similar to that described in Example 1 but the pH of its aqueous extract was 7.

The flannel was padded with a 1% solution of Polythiol A or a 3% solution of Polythiol C in trichloroethylene: in some experiments the solution also contained, as catalyst, 0.02% or 0.06% of diethylenetriamine, or 0.10% of tetrabutyl thiuram disulphide, or 0.10% of 2-mercaptobenzothiazole. The uptake of the solutions was adjusted so that each sample of flannel contained 3% of Polythiol A or 8% of Polythiol C. The samples were dried in a fanned oven at 50°C, stored at room

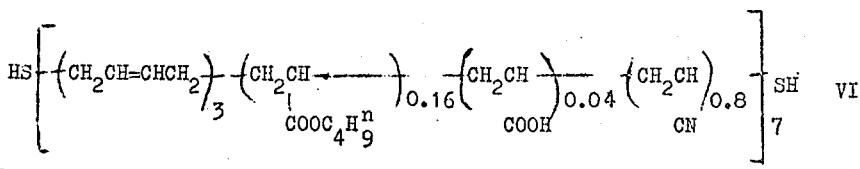

EXAMPLE 1

The cloth used was a wool flannel of approximately 170 g per square metre; the pH of its aqueous extract temperature for various lengths of time, and then washed.

Table A shows the results obtained; untreated flannel had a shrinkage of 23.5%.

TABLE A

| Polythiol | Catalyst | | % Area shrinkage on washing after curing for | | | |
|---|---|---|---|---|---|---|
| | name | amount applied on flannel (%) | 1 day | 2 days | 8 days | 22 days |
| A | Diethylenetriamine | 0.06 | 6.5 | 8.4 | 6.9 | 4.5 |
| A | Tetrabutyl thiuram disulphide | 0.3 | 9.3 | 13.6 | 7.9 | 5.5 |
| A | 2-Mercaptobenzothiazole | 0.3 | 12.6 | 16.8 | 11.7 | 7.4 |
| C | Diethylenetriamine | 0.16 | 3.5 | 4.0 | 2.5 | |
| A | — | — | 12.6 | 14.5 | 13.1 | 4.9 | was 3.1. The flannel was padded with a 4.8% solution of Polythiol A in trichloroethylene, containing 10% of monoethanolamine or dioctanoyl peroxide, or 40% of a solution of calcium naphthenate (containing 5% calcium), based on the weight of the polythiol, such that the uptake of the polythiol was 8% and that of monoethanolamine or dioctanoyl peroxide was correspondingly 0.8%, and that of the calcium naphthenate was equivalent to 0.16% of calcium. Then the flannel was dried at 50°C in a fanned oven. The samples were examined for shrinkage after storage at room temperature for various periods and then washing. A sample of flannel was also subjected to this severe washing but without prior treatment with Polythiol A.

On being washed after storage for 1, 2, and 8 days, samples of untreated flannel showed an area shrinkage of 20.5, 20.5, and 21.7%, whereas samples of the flannel treated with Polythiol A in the presence of monoethanolamine shrunk by only 3.5, 4.5, and 3.3%.

In a further experiment, flannel, on being washed 3 days after impregnation with Polythiol A in the presence of calcium naphthenate or dioctanoyl peroxide,

EXAMPLE 3

"Polythiol B" (80g) and 0.8 g of monoethanolamine were added to 190g of trichloroethylene. Wool flannel was padded to 270% uptake with this solution, dried in an oven for 10 minutes at 70°C, and then allowed to stand at room temperature in contact with air so that the polythiol cured on the cloth. Shrinkage on washing was determined as before and found to be, respectively, 4.5%, and 4.0%, one and two days after treatment.

EXAMPLE 4

This Example illustrates the application of a polythiol from an aqueous emulsion.

Two grams of a suspending agent, a methyl vinyl ether-maleic anhydride alternating copolymer (obtained from I.C.I. Limited under the designation "Viscofas L 30") were dissolved in 40g of hot water. The solution was cooled to about 25°C, and its pH was brought to 7.0 by adding about 3g of a 20% aqueous solution of sodium hydroxide. Then there were added 50 g of "Polythiol A" and 5g of Wetting agent A (a 50% aqueous solution of an adduct prepared from 1 mol. of mixed $C_{16} - C_{18}$ primary aliphatic amines and 70 mol. of ethylene oxide), and an emulsion was prepared by means of a high-speed stirrer.

Samples of this emulsion were diluted with water, a catalyst was added as indicated below, and portions of the flannel cloth were impregnated with the emulsion such that the uptake of the polythiol was 3%. The cloth was dried for 15 minutes at 70°C in a fanned oven, steamed for 2½ minutes with a steam iron, and then stored with free access to the air. Results obtained on storing for various periods and then washing are shown in Table B. Untreated wool flannel had a shrinkage of 24.5%.

Table B

| Catalyst | | % Area shrinkage on washing after curing for | | | |
|---|---|---|---|---|---|
| name | Amount applied on flannel | 1 day | 2 days | 8 days | 22 days |
| Diethylenetriamine | 0.06 | 12.6 | 9.3 | 6.4 | 6.9 |
| Di-isopropyl xanthogen disulphide | 0.3 | 5.4 | 5.9 | 5.9 | 5.9 |

EXAMPLE 5

This Example illustrates the use of a polythiol in conjunction with an epoxide resin.

A solution in trichloroethylene, containing 1.0% of Polythiol A, 0.20% of a polyglycidyl ether of 2,2-bis(4-hydroxyphenyl)propane, and 0.02% of diethylenetriamine was applied to wool flannel by padding to 300% pick-up. (The polyglycidyl ether was one prepared in a conventional manner and contained 5 – 5.2 1,2-epoxide group equiv./kg.) The cloth, impregnated with 3% of the polythiol, 0.6% of the epoxide resin, and 0.06% of the catalyst, was dried by being heated for 10 minutes in a fanned oven at 70°C, and then kept at room temperature in contact with air. The samples were then washed, and examined for shrinkage, as before. The shrinkages in area after being stored for 1, 2, and 8 days, were, respectively, 7.4, 6.0, and 5.5%, compared with 24.5% for untreated flannel.

EXAMPLE 6

In this Example, the use is demonstrated of a polythiol in treating wool cloth to effect both a setting and a shrinkproofing finish.

An emulsion of "Polythiol A" was prepared as described in the second paragraph of Example 3. Aqueous padding solutions were prepared by making up to 1 litre with water the following — (a) 86 g of the emulsion and 4.3 g of monoethanolamine and (b) 86 g of the emulsion, 4.3 g of monoethanolamine and 29 g of monoethanolamine sesquisulphite (MEAS) (66.5 – 71.5%) The flannel was impregnated and then, while still wet, was set by steaming with a steam iron for 2½ minutes: some samples were flat-set, while in others a crease was inserted. The specimens were left in contact with air for curing to be completed and were then washed and the shrinkage measured, as before. Table C shows the shrinkage results obtained. All of the patterns in which a crease had been inserted retained the crease on washing and also their smooth appearance.

Table C

| Uptake of | | % Area shrinkage on washing after curing for | | |
|---|---|---|---|---|
| MEA | MEAS | 1 day | 2 days | 8 days |
| 0.3 | 1.4 | 14.5 | 11.7 | 11.7 |
| 0.3 | — | 11.2 | 6.4 | 5.0 |

EXAMPLE 7

This examples illustrates the simultaneous application of a polythiol based on polybutadiene and another polymercaptan.

An emulsion was prepared by mixing, with a high-speed stirrer, 50 g of the tris(thioglycollate) of a triol having an average molecular weight of 4000 and made from glycerol and propylene oxide, 5 g of Wetting agent A, and 45 g of water. To each part by weight of this emulsion were added 46 parts of water, 2.0 parts of Polythiol A emulsion made according to Example 3, and either 0.03 part of diethylenetriamine or 0.15 part of di-isopropyl xanthogen disulphide.

Flannel was padded with the mixtures such that the uptake of Polythiol A was 2% and that of the tris(thioglycollate) was 1%. The flannel was dried in a fanned oven at 70°C for 15 minutes, and then stored in contact with air. Results obtained on washing after various periods of time are shown in Table D.

Table D

| Catalyst | | % Area shrinkage on washing after curing for | | |
|---|---|---|---|---|
| name | amount applied on flannel | 1 day | 2 days | 8 days |
| Diethylenetriamine | 0.06 | 4.5 | 4.5 | 5.0 |
| Di-isopropyl xanthogen disulphide | 0.3 | 6.9 | 7.4 | 7.4 |

In another experiment, flannel was impregnated with trichloroethylene containing 1.0% of Polythiol A and 0.33% of glycerol tris(thioglycollate), in the absence of a catalyst, such that the pick-up on the cloth was 3% of Polythiol A and 1% of glycerol tris(thioglycollate). The flannel was dried for 10 minutes at 70°C, then stored in contact with air. On being washed 8 days later, the cloth shrunk in area by 7.9%, compared with an average of 22% for untreated samples of the flannel. Similarly good results were obtained by using, in place of the glycerol tris(thioglycollate), an equal weight of ethylene glycol bis(thioglycollate) or the bis(thioglycollate) of a polypropylene glycol having an average molecular weight of 2,000.

EXAMPLE 8

This example illustrates the application of a polythiol to cotton poplin.

The following solutions were prepared:

| Solution 1 | Aminoplast A | 120 g/litre |
| | Magnesium chloride in water | 18 g/litre |
| Solution 2 | Aminoplast B | 100 g/litre |
| | Magnesium chloride in water | 18 g/litre |
| Solution 3 | Polythiol A in perchloroethylene | 20 g/litre |
| Solution 4 | Polythiol A in perchloroethylene | 40 g/litre |
| Solution 5 | Polythiol A in perchloroethylene | 80 g/litre |

Aminoplast A denotes a co-condensate of a methylated hexamethylol melamine, containing 4.5 methoxymethyl groups per molecule, and N,N'-dimethylol ethyleneurea.

Aminoplast B is a 75% aqueous solution of a methylated methylolmelamine, containing on average three N-methoxymethyl and two N-hydroxymethyl groups per molecule.

Samples of mercerised, bleached cotton poplin (110 g per sq. metre) were padded with one of the solutions described above and cured. They were then padded with a second solution and cured. Paddings were carried out to 70% expression with the aqueous solutions (1 and 2) and to 150% expression with the perchloroethylene solutions (3 – 5). Curing was effected at 150°C for 5 minutes with the aqueous solutions and at room temperature for 24 hours with the perchloroethylene solutions.

The dry crease angles of the treated samples were measured by the Monsanto method, twelve specimens (six folded warpwise, six folded weftwise) being used in each test; the specimens were creased under a 2 kg load for 3 minutes and allowed to recover, suspended over a wire, for 3 minutes before the crease angles were measured. The values given in Table E are the average of the six obtained by adding the warpwise value to the corresponding weftwise value and dividing by two. Tear strengths were determined by the Elmendorf method according to TAPPI Standard T 414n — 49. Three samples, each 63 mm x 63 mm, were used, and the tear strengths were measured in the warp direction.

Table E

| Treatment | | Properties | |
|---|---|---|---|
| First Soln. | Second Soln. | Crease angle (°) | Tear strength (g) |
| — | — | 40 | 924 |
| 1 | — | 94 | 400 |
| 2 | — | 97 | 384 |
| 3 | — | 48 | 757 |

Table E-Continued

| Treatment | | Properties | |
|---|---|---|---|
| First Soln. | Second Soln. | Crease angle (°) | Tear strength (g) |
| 4 | — | 56 | 872 |
| 5 | — | 58 | 856 |
| 1 | 3 | 109 | 412 |
| 3 | 2 | 111 | 432 |
| 2 | 3 | 116 | 496 |
| 4 | 1 | 103 | 416 |
| 1 | 4 | 112 | 408 |
| 5 | 1 | 100 | 496 |
| 1 | 5 | 105 | 436 |

From these results it may be seen that, whilst treatment with polythiol alone gives a slightly improved crease angle at the expense of a decreased tear strength, when aminoplast-treated material is also treated with polythiol the crease angles are improved without further loss of tear strength.

EXAMPLE 9

This example illustrates the application of a polythiol in conjunction with another type of aminoplast to a viscose rayon.

The following solution was prepared:

| Solution 6 | Aminoplast C | 200 g/litre |
| | Ammonium dihydrogen phosphate in water | 12 g/litre |

Aminoplast C is a 50% aqueous solution of a methylated urea-formaldehyde resin in which the U:F ratio is 1:1.8.

Samples of white viscose rayon of 1009 quality were padded to 80% uptake with Solution 6 and cured at 150°C for 5 minutes. Before or after this treatment the samples were padded to 250% uptake with Solution 4 and cured at room temperature for 24 hours. The crease angles and tear strengths were measured as described in Example 8. The results are given in Table F.

Table F

| Treatment | | Properties | |
|---|---|---|---|
| First Soln. | Second Soln. | Crease angle (°) | Tear strength (g) |
| — | — | 71 | 1832 |
| 6 | — | 86 | 1272 |
| 4 | — | 65 | 2104 |
| 4 | 6 | 85 | 2524 |
| 6 | 4 | 86 | 2080 |

Hence it may be seen that, while, when the polythiol is used alone, the crease angle is decreased and then the aminoplast is used alone the crease angle is increased but there is a 30% reduction in tear strength, the effect of the combined use of polythiol with aminoplast is to maintain the crease angle at the level obtained using aminoplast alone whilst the tear strength is raised.

EXAMPLE 10

Cotton poplin was padded to 70% uptake with Solution 1, dried, and the aminoplast on the cloth was cured by heating at 150°C for 5 minutes. Next, the cloth was impregnated with trichloroethylene containing, per litre, 10 g of either Polythiol A ("Solution 7") or Polythiol C ("Solution 8"), so that the uptake was 150%. The samples were then left for 24 hours at room temperature with free access to air.

Table G

| Treatment | | Properties | |
|---|---|---|---|
| First Soln. | Second Soln. | Crease angle (°) | Tear strength (g) |
| — | — | 53 | 1056 |
| 1 | — | 108 | 404 |
| 1 | 7 | 123 | 468 |
| 1 | 8 | 126 | 396 |

We claim:

1. A process for rendering fibrous keratinous textile material shrink-resistant which comprises (1) applying to the material from a liquid medium about 0.5 to 15% by weight of the textile material of a polythiol of the average formula

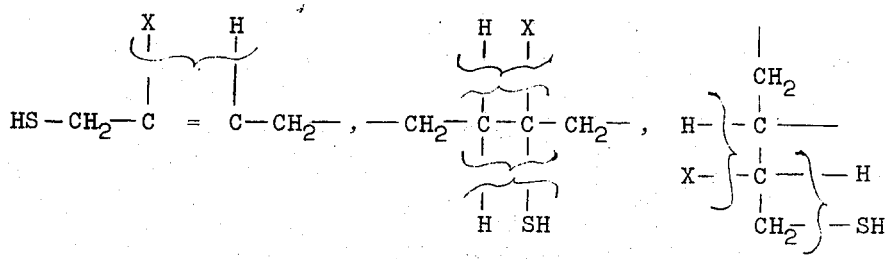

wherein
each X and Y independently represents a substituent selected from the group consisting of hydrogen atoms and methyl groups,
Z represents a radical selected from the group consisting of —CN, —COOH, —CONH$_2$, —COOR, —C$_6$H$_5$, and —OCOR, where R is an alkyl group of one to eight carbon atom,
$q$ represents zero or has a value of at most 1, and
$r$ is an integer such that the average number molecular weight of the polythiol is at least 500 and at most 50,000, and (2) curing the polythiol at a temperature up to 180°C in the presence of a catalyst which is selected from the group consisting of bases, siccatives, oxidative curing agents, sulfur, mercaptobenzothiazoles, dithiocarbamates, thiuram sulfides, thioureas, organic disulfides containing not more than two sulfur atoms, alkyl xanthogen disulfides, and alkyl xanthates.

2. The process of claim 1 wherein the polythiol is a polythiol of a member selected from the group consisting of homopolymers of butadiene, homopolymers of methylbutadiene, and copolymers of butadiene and acrylonitrile containing not more than 33 mol percent of acrylonitrile.

3. The process of claim 2, wherein the polythiol contains structural units selected from the group consisting of those of the formulae

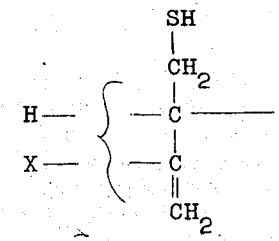

and

4. Shrink resistant fibrous keratinous textile material produced by the process of claim 1.

5. A process for rendering cellulosic textile material shrink-resistant and creaseproof which comprises
   1. applying to the material from a liquid medium about 0.5 to 15% by weight of the textile material of a. a polythiol of the average formula

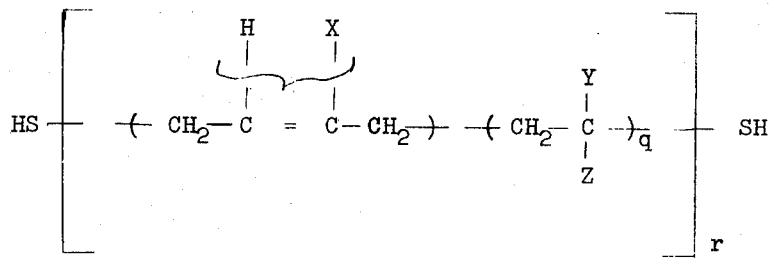

wherein
- each X and Y independently represents a substituent selected from the group consisting of hydrogen atoms and methyl groups,
- Z represents a radical selected from the group consisting of —CN, —COOH, —CONH$_2$, —COOR, —C$_6$H$_5$, and —OCOR, where R is an alkyl group on one to eight carbon atoms,
- q represents zero or has a value of at most 1, and
- r is an integer such that the average number molecular weight of the polythiol is at least 500 and at most 50,000, and b. about 1–10% by weight of an aminoplast creaseproofing agent supplying, per thiol group equivalent of the polythiol, from 2 to 75 group equivalents of groups selected from the group consisting of N-methylol, N-alkoxymethyl, and N-acetoxymethyl groups, and 2. curing the polythiol and the aminoplast on the material at a temperature in the range of ambient to 200°C in the presence of a catalyst which is selected from the group consisting of bases, siccatives, oxidative curing agents, sulfur, mercaptobenzothiazoles, dithiocarbamates, thiuram sulfides, thioureas, organic disulfides containing not more than two sulfur atoms, alkyl xanthogen disulfides, and alkyl xanthates.

6. The process of claim 5 wherein the polythiol is a polythiol of a member selected from the group consisting of homopolymers of butadiene, homopolymers of methylbutadiene, and copolymers of butadiene and acrylonitrile containing not more than 33 mol percent of acrylonitrile.

7. The process of claim 6, wherein the polythiol contains structural units selected from the group consisting of those of the formulae

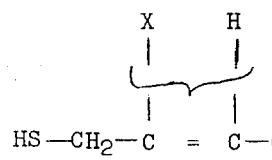

and

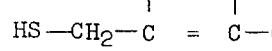

8. Shrink resistant and creaseproofed cellulosic fabric material produced by the process of claim 5.

* * * * *